United States Patent [19]

Sudler

[11] Patent Number: 4,727,263

[45] Date of Patent: Feb. 23, 1988

[54] ELECTROMOTIVE SETTING DEVICE

[75] Inventor: Roland Sudler, Frankfurt am Main, Fed. Rep. of Germany

[73] Assignee: VDO Adolf Schindling AG, Frankfurt am Main, Fed. Rep. of Germany

[21] Appl. No.: 900,220

[22] Filed: Aug. 26, 1986

[30] Foreign Application Priority Data

Sep. 6, 1985 [DE] Fed. Rep. of Germany ....... 3531796

[51] Int. Cl.[4] ........................ H02B 1/24; G06C 15/42; G06M 1/28

[52] U.S. Cl. .................................... 307/112; 307/119; 307/122; 307/142; 235/144 ME; 235/144 R; 235/144 E; 377/88; 377/89

[58] Field of Search ............... 307/112, 116, 119, 122, 307/142; 235/144 ME, 144 R, 144 E; 377/88, 89

[56] References Cited

U.S. PATENT DOCUMENTS

| | | | |
|---|---|---|---|
| 3,177,645 | 4/1965 | Devanney | 377/88 X |
| 3,253,127 | 5/1966 | Morreale | 377/89 |
| 3,289,131 | 11/1966 | Watkins et al. | 377/89 |
| 4,376,895 | 3/1983 | Meister | 307/142 X |
| 4,507,549 | 3/1985 | Secord | 235/144 R X |

FOREIGN PATENT DOCUMENTS

| | | | |
|---|---|---|---|
| 1076973 | 3/1960 | Fed. Rep. of Germany | 377/89 |
| 3405950 | 8/1985 | Fed. Rep. of Germany | 235/144 ME |

*Primary Examiner*—William M. Shoop, Jr.
*Assistant Examiner*—Sharon D. Logan
*Attorney, Agent, or Firm*—Martin A. Farber

[57] ABSTRACT

In an electromotive control device having an end disconnect switch, two circular conductive paths are arranged on an insulating support, at least one of said paths being less than an entire circle. Wiper contacts which connect the conductive paths are electrically connected to each other and are connected to a wheel which is driven by a motor, the wheel being mounted coaxially to the conductive paths. The limit disconnect switch and thus a setting element can be manufactured at low cost by the invention.

9 Claims, 4 Drawing Figures

Fig. 1
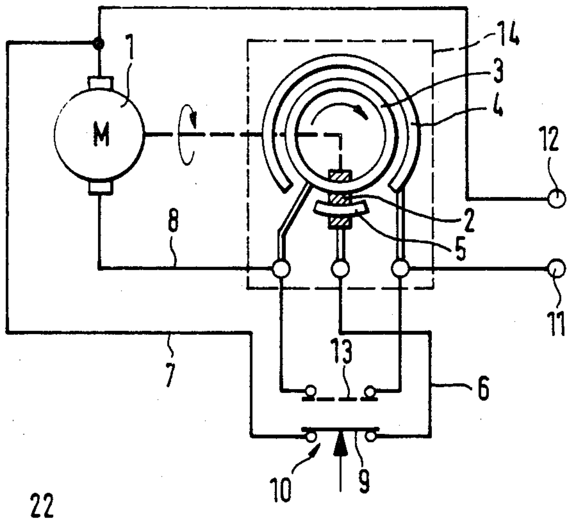
Fig. 2
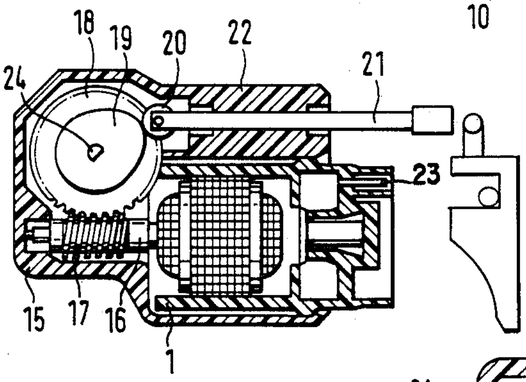
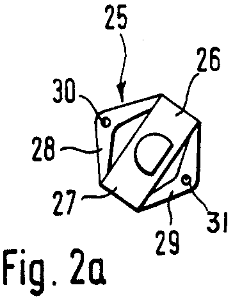
Fig. 2a
Fig. 3
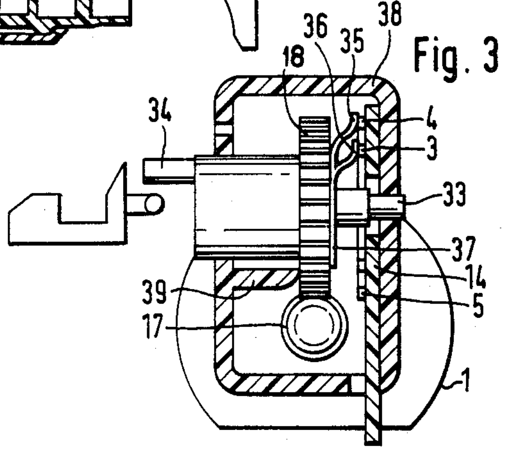

ELECTROMOTIVE SETTING DEVICE

FIELD AND BACKGROUND OF THE INVENTION

The present invention relates to an electromotive setting element having an end disconnect switch.

For various mechanical actuations, setting elements are used in which an electric pulse is fed to a solenoid whose armature effects the required movement within a short time. Particularly for larger setting situations there are frequently provided electromotive setting elements wherein a drive motor is disconnected by means of switches provided for this purpose, when one or both end positions of a drive movement are reached. Such switches, which are therefore to be installed in addition to the motor and a transmission in such electromotive setting elements, represent an increase in the cost of the setting element.

SUMMARY OF THE INVENTION

The object of the present invention, accordingly, is to provide an inexpensive apparatus for the end switching of an electromotive setting element.

According to the invention, two circular conductive paths are arranged on an insulating support, at least one of the paths being less than a full circle. Wiper contacts which contact the conductive paths, are electrically connected to each other, and are connected to a wheel which is driven by the motor and is mounted coaxially to the conductive paths. The electromotive setting element of the invention is advantageous in that it can be manufactured at particularly low cost.

A further aspect of the invention resides in the fact that one of the conductive paths has a longer portion and a shorter portion which are electrically separated from each other. As a result of this feature, a favorable result is obtained of disconnecting the motor upon the reaching of its end position; and also of short-circuiting the motor for purposes of braking.

Another aspect of the invention resides in the fact that the wiper contacts are arranged on a sheet-metal portion which is developed as leaf spring and surrounds the shaft (which is provided with a flat portion) of the wheel; the surfaces of which spring lie between the wiper contacts and rest against the wheel. This further development represents a particularly simple form of the wiper contacts and contributes, in particular, to an inexpensive assembling of the setting element of the invention.

Other developments concern configurations of the electric circuit forming portion of the setting element of the invention.

A preferred use of an electromotive setting element resides in a zero-resetting of a trip odometer for automotive vehicles, and it is characterized by the fact that a wheel which is driven by a motor has a cam which is operatively connected with a zero-resetting element of the trip odometer, that a switch is provided which, at a given position of the wheel, disconnects the motor from a source of voltage, and that the switch can be bridged over by the working contact of a push-button switch.

Upon this use of the electromotive setting element, an advantage is obtained, as compared with the use of solenoids, that the zero-resetting of the trip odometer does not take place as abruptly and that the course of its movement is better adapted to the odometer. It is possible, in principle, to make use here of a limit switch of known construction.

Further features of the invention relate to the development of the cam and to the fact that the switch is developed as short-circuit brake.

BRIEF DESCRIPTION OF THE DRAWING

With the above and other objects and advantages in view, the present invention will become more clearly understood in connection with the detailed description of a preferred embodiments, when considered with the accompanying drawing, of which:

FIG. 1 diagrammatically shows a first embodiment of the invention;

FIG. 2 is a longitudinal section through a second embodiment,

FIG. *2a* is a sectional view of a second embodiment; and

FIG. 3 is a cross section through a third embodiment.

In the figures, identical parts have been provided with the same reference numbers.

DETAILED DESCRIPTION OF THE PREFERRED EMBODIMENTS

In apparatus in accordance with FIG. 1, a motor 1, via a transmission (not shown) drives a wheel (also not shown) which is provided with a contact device 2. The contact device 2 has two wiper contacts and connects an inner wiper ring 3 with outer wiper ring formed of two portions 4 and 5. Details as to the development of the contact device 2 will be explained with reference to FIG. 2.

The outer wiper ring is divided into a longer portion 4 and a shorter portion 5. The wiper rings are arranged as conductive paths on an insulating board. The rings can therefore be manufactured at extremely low cost by known methods for the manufacture of printed circuits. The rings preferably consist of copper and are coated with a nobler metal in order to prevent oxidation. However, the invention is not limited to the concentric arrangement of the wiper rings shown in the drawing. It would also be possible, for example, to use wiper rings which are arranged alongside of each other on the outer surface of a cylinder.

In the position shown, the contact device 2 connects the inner wiper ring 3 to the portion 5 of the outer wiper ring and thus short circuits the motor 1 via the lines 6, 7 and 8 and the normally closed contact 9 of a push-button switch 10.

The longer portion 4 of the outer wiper ring is connected to one pole 11 of a source of voltage, not shown. The motor is connected to the inner wiper ring and to the other pole 12 of the source of voltage.

In the position of the contact device 2 shown in the drawing, the motor is short-circuited, as already stated above, and is therefore stationary. By depressing the push-button 10, this short circuit is eliminated by the opening of the normally closed contact 9, and the pole 11 of the source of voltage is connected to the motor via the working contact 13. The motor 1 thus starts up. After a short time, the contact device 2 has reached a position at which it connects the inner wiper ring 3 and the longer portion 4 of the outer wiper ring to each other, that the push-button switch 10 can be released and the motor continues to operate until the position shown in the drawing is again reached.

FIG. 2 is a longitudinal section through a second embodiment in which the motor 1 and the other moving parts are mounted in a housing 15. On the motor shaft 16 there is arranged a worm 17 which engages in a worm wheel 18. On the shaft 24 of the worm wheel 18 there is a cam 19 on the peripheral surface of which there travels a roller 20 which is rotatably mounted within a recess on a end of a ram 21. A ram 21 is guided in a housing portion 22 and is connected with the zero-resetting element of a trip odometer. The latter is known per se and need not be further explained in connection with the invention. In the vicinity of the motor there is located a plug socket 23 for electrical connections to the source of voltage and the push-button switch 10 (FIG. 1).

A contact spring 25 is placed over a shaft 24 of the worm wheel 18, said shaft being flattened on one side, the contact spring being shown enlarged in FIG. 2*a* for greater clarity. A cutout in the contact spring which is shaped in accordance with the cross section of the shaft 24 secures the contact spring 25 from turning with respect to the worm wheel 18 and the cam 19. The surfaces 26 and 27 of the contact spring 25 rest against the surface of the cam 19.

It should furthermore be mentioned here that the arrangement shown in FIG. 2 can also be modified, by way of alternative embodiment, in the manner that the cam 19 is arranged on the non-visible side of the worm wheel 18 so that the contact spring 25 rests against the worm wheel 18.

Portions 28 and 29 of the contact spring 25 are bent away from the surface of the cam 19 and bear wiper contacts 30 and 31 which are arranged at different distances from the shaft corresponding to radii of the wiper rings.

The wiper contacts 30 and 31 contact circular conductive paths with suitable pressure, these paths not being shown in FIG. 2 for the sake of greater simplicity but corresponding to the ones shown in FIG. 1.

The third embodiment is shown in cross section in FIG. 3. In this embodiment also, a motor 1 drives a worm wheel 18 via a worm 17. A shaft 33 of the worm wheel 18 is developed as a crank on one side by a suitable enlargement of the diameter of the shaft 33 and provision of a pin 34 which may be connected to a load such as the aforementioned odometer. On the other side of the worm wheel 18, wiper contacts 35, 36 are arranged on a correspondingly shaped contact spring 37. In contradistinction to the arrangement shown in FIG. 2, both contacts are arranged on the same side of the shaft 33. This, however, is immaterial for the operation of the invention since the inner wiper ring covers a full circle. The position of the wiper 36 is therefore immaterial.

FIG. 3 furthermore shows a housing 38 as well as a circuit board 14 which bears the conductive wiper ring paths 3 and 4 and 5 respectively. The housing 38 comprises a run-on bead 39 which provides guidance for the worm wheel 18 in axial direction.

I claim:

1. An electromotive setting device having a limit switch, the device comprising an insulating support and a wheel;

two circular conductive paths arranged on said insulating support coaxially about an axis of said wheel, at least one of said paths extending less than a full circle;

wiper contacts connecting with said conductive paths and being electrically connected to each other to form said limit switch; and a motor, said wheel being connected to said wiper contacts and being driven by said motor; and wherein a first path of said conductive paths has a longer portion and a shorter portion which are electrically separated from each other.

2. The electromotive setting device according to claim 1, further comprising a circuit comprising a push button switch having a working contact, said circuit including said two conductive paths and said motor; and wherein, in said circuit, a first terminal of the motor is connected to a first pole of a source of voltage;

a second terminal of the motor and a second pole of the voltage source are connected to respective ones of said conductive paths via said push button switch; and said two conductive paths are connected to each other by said working contact of said push-button switch.

3. The electromotive setting device according to claim 1, further comprising a circuit comprising a push button switch having a working contact and a normally closed contact, said circuit including said two conductive paths and said motor; and wherein, in said circuit, a first terminal of the motor is connected to a first pole of a source of voltage;

a second pole of the source of voltage is connected to said longer portion of said first conductive path, and a second terminal of the motor is connected to a second path of said conductive paths;

said working contact connects said longer portion and said second conductive path to each other; and said closed contact connects said shorter portion of said first path and said terminal of the motor to each other.

4. An electromotive setting device used for zero-resetting of a trip odometer of an automotive vehicle, according to claim 1, the odometer having a zero-resetting element, the device further comprising cam means operatively connected between said wheel and said zero-resetting element of the trip odometer; and a push-button switch having a working contact connected between a pair of terminals of said limit switch.

5. The electromotive setting device according to claim 4, further comprising a ram operatively coupled between said cam means and said zero-resetting element.

6. The electromotive setting device according to claim 4, wherein said cam means comprises a crank.

7. The electromotive setting member according to claim 4, wherein said limit switch is formed as a short-circuit brake.

8. An electromotive setting device having a limit switch, the device comprising an insulating support and a wheel;

two circular conductive paths arranged on said insulating support coaxially about an axis of said wheel, at least one of said paths extending less than a full circle;

wiper contacts connecting with said conductive paths and being electrically connected to each other to form said limit switch;

a motor, said wheel being connected to said wiper contacts and being driven by said motor;

a contact spring, said wiper contacts being supported by said contact spring;

a shaft extending from said wheel, said shaft being formed with a flattened portion; and wherein said spring surrounds said shaft and includes surfaces lying between said wiper contacts and resting against said wheel.

9. The electromotive setting device according to claim 8, further comprising a worm disposed on a shaft extending from said motor; and wherein said wheel is a toothed wheel which engages in said worm; and said contact spring is formed as a leaf spring.

* * * * *